March 30, 1965  E. S. DOUGLAS  3,176,263
MEASURING AND RECORDING METHOD AND APPARATUS
Filed Aug. 19, 1960  2 Sheets-Sheet 1
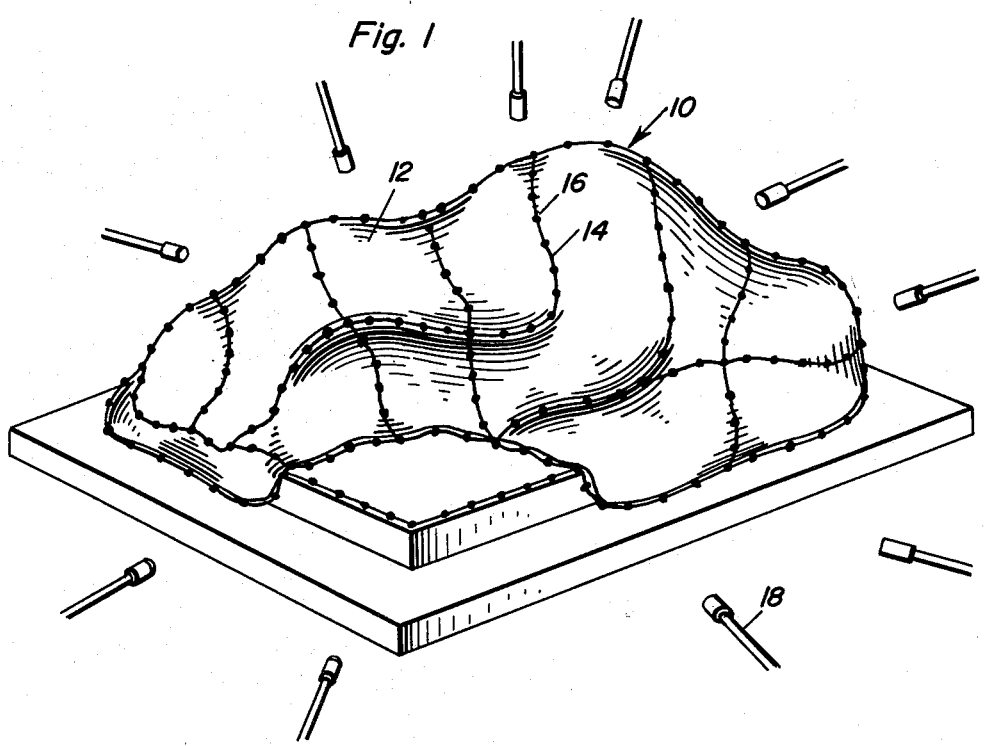
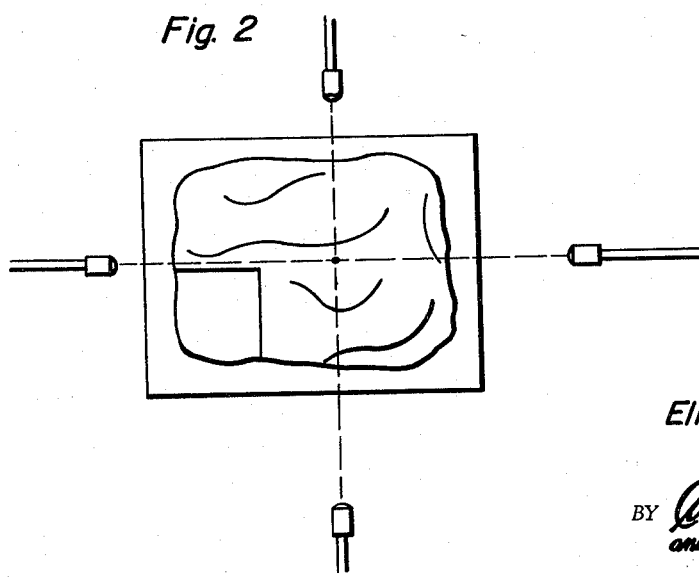
Ellwood S. Douglas
INVENTOR.

Ellwood S. Douglas
INVENTOR.

3,176,263
MEASURING AND RECORDING METHOD AND
APPARATUS
Ellwood S. Douglas, 1429 Oregon St., Berkeley, Calif.
Filed Aug. 19, 1960, Ser. No. 50,729
17 Claims. (Cl. 340—16)

This invention relates generally to a method and apparatus for measuring and recording the size and shape of solid objects.

Industrial and manufacturing requirements often require that accurate measurements be made of the dimensions of a model. Moreover, a record of the measured dimensions is necessary for future use by machines which produce molds, dies, etc.

The procedure of accurately measuring the dimensions of an irregular object is slow and tedious if done by known manual methods. Machines available to do the job require large or intricate mechanisms with close tolerances and therefore are exceedingly expensive. Since many measurements are needed for irregular surfaces, the manual or mechanical methods are most often too slow.

In view of the above, it is the principal object of this invention to provide a method of measuring the size and shape of solid objects which method provides the requisite data at a much lower cost and at a faster rate than known procedures.

It is a more particular object of this invention to provide a method of measuring the size and shape of solid objects which method includes the obtaining of data with respect to a plurality of points positioned on the surface of the object to be measured. The data obtained is well adapted for use with digital computing techniques which are capable of calculating the position of each of the surface points with respect to a suitable set of reference axes. The various points on the surface will be recorded as digital information on magnetic tape, or other media which may be suitable. The computer can sort the points to eliminate those which may have been entered in error and calculate the surface of best fit, smoothing if desired. The coordinates of a set of points on the surface under consideration can be calculated, after detection, and recorded for future use. Moreover, the computer is able to calculate instructions for a milling machine which is employed to make a die or mold for a given object.

It is a still more particular object of this invention to provide a method of measuring the size and shape of solid objects which method enables measurements of the position of points on a surface to be made to an accuracy of tenths, hundredths, or thousandths of an inch. The measurements are made in an extremely short time and at a lower expense than heretofore realized.

It is a still more particular object of this invention to provide a method of measuring the size and shape of solid objects which method includes the principle of producing an individual sound at each of a plurality of spaced points along the space of an object. Sound detection means, as microphones, are positioned at several detection points spaced from the object under investigation. The time of sound transmission from the particular surface point at which the sound is produced is measured to each of the microphones by digital techniques well known in the art. By comparing the detected sound, the position of the point at which the sound was produced can be accurately measured and recorded.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a solid object of irregular shape which is being measured in accordance with the teachings of the invention by producing sounds at a plurality of spaced points along the surface of the object;

FIGURE 2 is a top plan view of the irregular solid object under investigation showing, for example, how the sound detecting means as microphones may be positioned with respect thereto.

Figure 3:
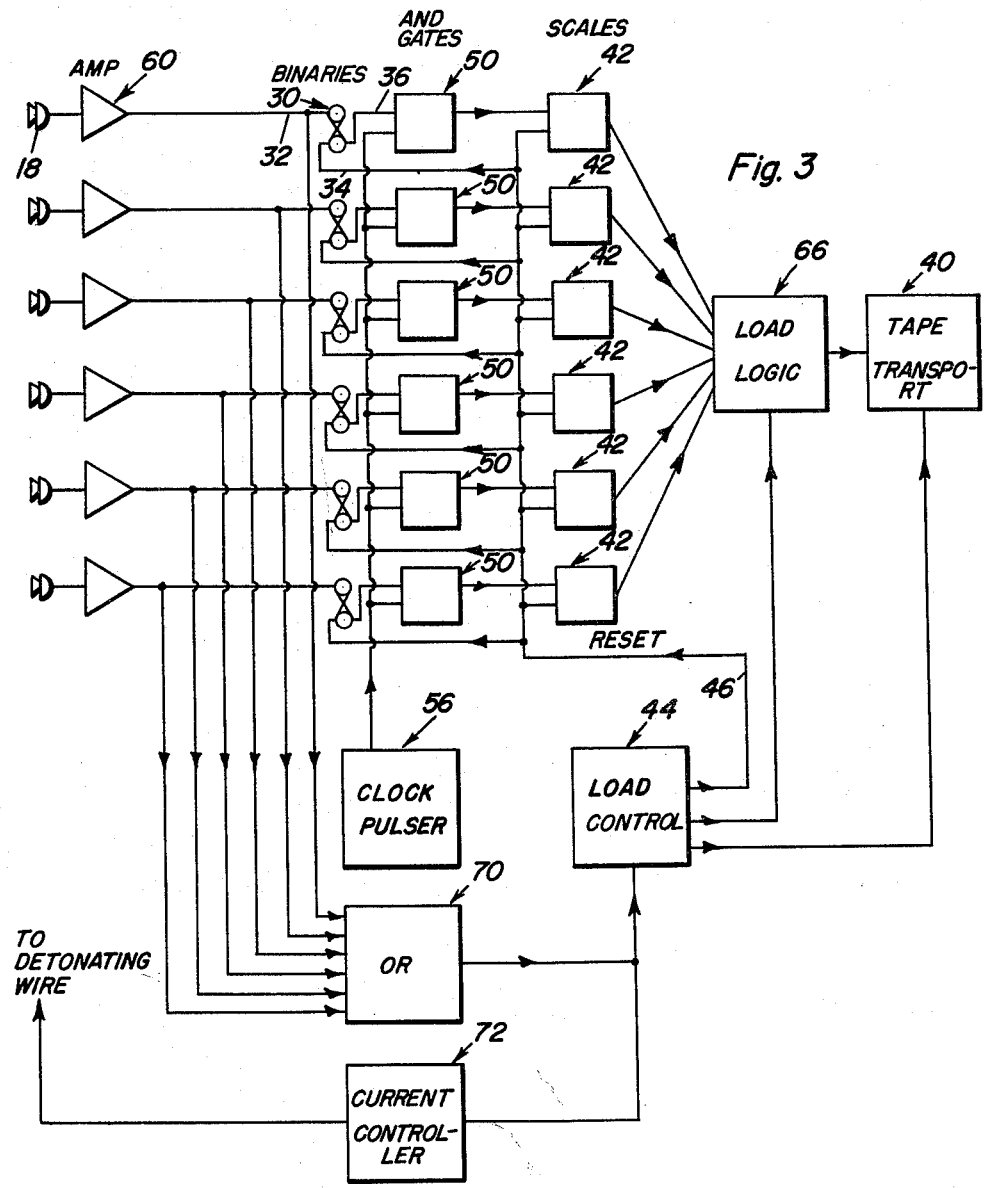
FIGURE 3 is a schematic diagram showing an exemplary circuit which may be employed in conjunction with the sound detecting microphones enabling the detected sounds to be compared and recorded.

Digital computing and magnetic recording of data for and by digital computers are established techniques as is the programming of cutting and shaping machinery in accordance with such data. Although there are many well established techniques for measuring position and distance electronically, none are suitable in the present form to the problem at hand. Specifically, the problem is to make measurements of the positions of points on an irregular surface of a solid object to an accuracy of tenths, hundredths or thousandths of an inch. The points will all be concentrated within a few feet. It is necessary that measurement of many such points be made in a short time but each measurement must represent an individual point.

Existing position locating systems depend on mechanical measurements of distances or angles, or on measurements of time. Mechanical methods are too slow and require precision machining. Time measurements of distance depend on some velocity. Distances of interest in the problem at hand divided by the velocity of electromagnetic energy propagation give times too short to be easily measured. On the other hand, these distances divided by the velocity of sound in air give times in the range large enough to be easily measured and small enough to allow a reasonable number of repeated measurements per second. Sound propagation of .01 inch corresponds to about 1 microsecond while sound propagation over 10 feet corresponds to about 10 milliseconds. Accordingly, if we are measuring a body whose largest dimension is 10 feet corresponding to a travel time of $\frac{1}{100}$ of a second, measurements could be made at a maximum rate which is the reciprocal of the maximum travel time or nearly 100 per second.

Sound reflective systems are not able to provide the desired data because of the difficulty of concentrating enough acoustic energy on a single point of reflection. Therefore, the point to be measured must be the source of the sound itself in accordance with the method of the present invention.

Initial attention is accordingly called to FIGURES 1 and 2 wherein a solid object 10 which is desired to be measured, is illustrated. The object 10 has a surface 12 of highly irregular contour which includes a multitude of points with respect to which precise data must be obtained. As hereinbefore indicated, it is necessary to create or produce sound at each of these multitude of points on the surface. By employing apparatus able to recognize the sound from a particular point, the position of the point may be determined and it will therefore be apparent that if the position of enough points are determined, the irregular contour of the surface may be recorded.

The means for producing sound at each of a multitude of points on the surface 12 of the object 10 pursuant to the method of this invention may be any of several. The points could be distributed regularly or randomly over the surface and the sounds from each source could be repeatedly produced regularly or randomly in time within the aforementioned limitations of sound propagation. FIGURE 1 illustrates one form of sound sources which could be utilized. An electrical conductor 14 is draped about the irregular contour of the object 10. The conductor 14 carries small explosive charges 16 which produce random sounds as a current is passed through the conductor 14 and the explosive charges are heated. Some other means which may be employed to produce the desired sound at the various points include the use of electric sparks, impact of particles striking, or anything else that would originate enough acoustic energy in a sufficiently small space and short time.

The explosive charges 16 can be fastened by any appropriate means at intervals along the conductor 14. In turn, the conductor 14, after being draped over the object 10, can be glued or taped to the surface 12 thereof, so as to distribute the charges 16 over it. As noted, the charges may be set off repeatedly in random order by merely heating the wire by passing a current through it each time, it being appreciated that the time for heating the wire to the detonation temperaure depends upon the magnitude of the current and the resistance of the wire at each charge point. The average rate of explosion can be controlled by measuring the rate, converting it into an electrical signal, subtracting from the desired rate, and feeding the difference back to a current control unit by means of which current is controlled for this purpose as hereafter explained.

Sound detecting means, as microphones 18, are disposed in fixed position spaced from the surface 12 of the object 10 and are of course spaced from the sound sources 16 fixed to the surface 12. Each of $n$ microphones placed around the object 12 will receive a pulse at a different time $t_n$. If the position of each microphone is known, any four of the group of times $t_n$ are sufficient to locate the source of the sound or noise in both time and space. If, on the other hand, the time of the sound is known, only three of the times $t_n$ are necessary to locate the sound source in space. It will be seen therefore that if four or more microphones are employed, there is no need to know the time of origin of the sound; for this reason, the sounds can occur at random in space and time. Those which occur too close together in time may be lost, but this does not matter if sound sources at a sufficient number of points are employed.

Some points on the surface 12 of the object 10 may be hidden from some of the mircophones by other parts of the object. This will not matter however, if enough microphones are used so that at least four can be seen from any particular point on the surface 12. The computing apparatus which may be employed with the microphones can be programmed to select the four correct times. The use of more than four microphones (redundancy of data) permits the computer to decide which detected sounds are proper items of data and which are to be rejected since the majority of the measurements will be correct so as to produce a dominating readout rendering any erroneous outputs ineffective. Redundancy can also be used to reduce the uncertainties of the measurements. The positions of the microphones can be calibrated by making measurements on known points. If this is done at known times, time dependent errors such as changes in the velocity of sound due to temperature can be calculated and corrected by computer apparatus.

From the foregoing, it will be apparent that by employing appropriate apparatus in conjunction with the microphones 18, the time of sound propagation from the particular point on the surface 12 of the object 10 can be measured. By comparing the different times of propagation from the single sound source to the various microphones, the position of the sound source is known. Although several different techniques may be employed in conjunction with the microphones 18 for comparing and recording the detected sounds at the microphone detection points, one specific system or form of apparatus will be discussed hereinbelow, it being understood that this form, shown in FIGURE 3, is exemplary only and that the details of the system components diagrammatically illustrated form no part of the present invention.

Attention is now called to FIGURE 3 and in conjunction therewith certain observations will be offered with respect to conventional and well known digital techniques. A digital quantity is one which has one of several possible discrete values. A binary device has one of two possible states. One of the states is usually referred as a *one*, the other as a *zero*. In electronic circuitry the two states are usually two different voltages which some terminal may have with respect to ground. On magnetic tape the two states might be magnetization of a certain part of the tape in different directions. On paper tape or cards, a *one* is typically indicated by the presence of a punched hole, and a *zero* by its absence. A binary, toggle, or flipflop is designated generally by the numeral 30 in FIGURE 3. Such a device has two stable states. It may be set to either state and will remain there until it is set to the other. A means may be provided to complement the binary, or in other words, to make it change to the other state no matter which state it may be in.

Referring to the binary 30 of FIGURE 3 momentarily, a *one* at the upper input 32 sets the binary to hold a *one*. On the other hand, a *one* at the lower input 34 sets the binary to hold a *zero*. At the lower binary output 36 a *zero* indicates that the binary holds a *one* while a *one* here indicates that the binary holds a zero.

A gate is a circuit which has one output and several inputs. An and gate is a gate whose output is a *one* if all of its inputs are *one* but is *zero* otherwise. An or gate is one whose output is a *one* if any of its inputs is a *one*, but is a *zero* if none of its inputs are *one*.

A scaler is a group of binaries, each driving the next so that as one changes from *one* to a *zero* the next is complemented or changes its state. It is to be noted that when the preceding binary changes from *zero* to *one*, the succeeding binary is not complemented. Therefore, each binary will be complemented only half as often as the previous one. Each binary has two possible conditions, and $n$ of them therefore have $2^n$ possible conditions. If each of these conditions is said to correspond to one and only one of the numbers smaller than $2^n$, and if these numbers are properly chosen, complementing the first binary of a scaler some number of times will cause the scaler to be left in the condition corresponding to that number. The scaler therefore, counts the number of pulses which have arrived at its input.

The purpose of the circuitry shown in FIGURE 3 is to record on magnetic tape six numbers, each of which represents the time of arrival of acoustic wave front at a particular microphone 18. The tape transport 40 positions the magnetic tape so that the numbers will be recorded in their proper places, and does the actual recording. Any suitable tape transport having start and stop facilities could therefore be utilized such as shown for example in Patent No. 2,533,499.

Six identical signal channels are employed, each beginning with a microphone 18 and terminating in a scaler 42. The operation of the system is initiated when a load control unit 44 sends a pulse out on the line marked reset designated by the numeral 46. Control apparatus for this purpose is generally known in the art, the details of which form no part of the present invention. This pulse sets all the binaries 30 to *zero* and also all the scalers 42 to *zero*. The scalers 42 now contain *zero* and since the binaries 30 feeding the and gate 50 are *zero*, each and gate has a *one* at its upper input 36 connected to the lower output of the binary. As pulses arrive from the clock pulser 56 (a pulse is *one*, no pulse *zero*), the and gate outputs are pulsed to *one* at the same time. These and gate output pulses are at equal time intervals and arrive at the scaler inputs and are counted. All the scalers 42 are counting the same train of pulses and at any time, they should all be in the same condition or hold the same number. It is to be noticed that they are counting equally spaced pulses, this number corresponds to the time which has elapsed since the reset pulse. This condition continues and the count of the scalers 42 increases until a sound louder than some predetermined level reaches one of the microphones as a result of sound emitted from a charge point 16. The output of the particular microphone 18 is amplified by amplifiers 60 to a level great enough to operate a binary 30 in order to establish a time measurement. The binary 30 of one of the channels is therefore set to *one*, and this brings the upper input of the corresponding and gate to *zero*. If one input of an and gate is *zero*, the output stays at *zero* in spite of what the other input does. Therefore, the and gate having the *zero* input from the particular binary will have a *zero* output despite the *one* input of the clock pulser. Therefore, no more pulses will appear at the input of the scaler 42 corresponding to the particular and gate 50. The count in the scaler will remain at its last value until the reset line 46 is again pulsed at the start of the next cycle so that the time measurement associated therewith may be recorded. The other scalers 42 continue to count. One by one they stop at some count which corresponds to the time at which a sound arrives from the charges 16 at one of the microphones. When all of the scalers 42 have stopped, or after some predetermined time has elapsed, this phase of the operation comes to an end. The load control unit 44 sends the necessary readout command signals to a load logic 66 and to the tape transport 40. The details of the load logic form no part of the present invention, it being apparent that logic networks for achieving functions as described are known to those versed in the art. The tape starts to move and the load logic senses the numbers stored in each of the six scalers 42, one at a time, translates them to a suitable form to be recorded and sends them to the tape transport where they are recorded on tape. Then the load control unit signals the tape transport to stop and sends out a reset pulse on line 46 so as to initiate the process all over again.

An or gate 70 is provided with the inputs thereof connected to the outputs of each of the amplifier 60 so as to control the rate of charge detonation and the phasing of the cycles by the reset pulses. As noted previously, when any one of the inputs to an or gate is *one*, the output thereof is *one*. The or gate 70 is connected to the current controller 72 which is connected to the detonating conductor 14. Current controllers for accomplishing the functions described herein are available and known to those skilled in the art. The current controller recognizes the rate at which the signals are being detected by the microphones 18 inasmuch as the output of the or gate 70 will reflect the detection of the sound by any one of the microphones 18. By sensing the rate at which the sounds are being detected, the current controller 72 will control the current to the detonating conductor 14 so as to increase or decrease the current thereto to vary the rate of detonation of the charges 16 in accordance with the longest sound travel times as hereinbefore explained. The or gate 70 is also connected to the load control unit 44. The or gate 70 informs the load control unit 44 when there is at least one or more signals being picked up by the microphones 18. This is so inasmuch as anyone of the microphones will provide a *one* to an or gate input thereby making the output to the load control unit *one*. On the other hand, if none of the or gate inputs are *one*, the load control unit 44 will be informed that the microphones 18 have not detected any sound pulse. The outputs from the microphones may thereby be programmed as hereinbefore indicated so as to select the four or more of the outputs associated with that charge point to which each cycle is related by the reset pulse.

From the foregoing, it should be appreciated that applicant has herein disclosed a novel method along with suggested apparatus for determining the measurements of solid objects of irregular shape. It will be apparent that recorded data may be obtained which would permit the duplication of a solid object in both size and shape at a future date. The data obtained by the method is extremely adaptable for recording techniques, and the recorded information is extremely useful for programming a computer operable to control milling machines for forming molds or dies at which stage any erroneous information that may have been recorded will be rejected.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a method of measuring the unknown size and shape of solid objects comprising the steps of producing sounds directly at spaced points on an unmeasured surface of said object; detecting some of said produced sounds at a plurality of detection points spaced from said object; and measuring the relative travel times of said produced sounds to each of said spaced detection points respectively to determine the size and shape of said object.

2. In the method of claim 1 wherein said sounds are produced randomly in time.

3. In the method of claim 1 wherein said sounds are produced at randomly distributed points on said surface.

4. In a method of measuring and recording the size and shape of solid objects comprising the steps of producing sounds directly at spaced points on the surface of said object, detecting some of said produced sounds at a plurality of known detection points spaced from said object and registering in time said sound detected at each of said detection points.

5. The method of claim 4 wherein the step of producing sound consists of applying to the surface of said object a plurality of separate electrically operated sound producing elements disposed in relatively fixed positions thereon and energizing said elements.

6. In a method of measuring and recording the size and shape of solid objects comprising the steps of producing sounds directly at spaced points on the surface of said object, detecting some of said produced sounds at a plurality of detection points spaced from said object, registering in time said sound detected at each of said detection points and recording information with respect to the detected sounds indicative of the various sound transmission times between the point on said surface at which said sound is produced and the detection points spaced therefrom.

7. In apparatus for measuring and recording the size and shape of solid objects including; means for producing sounds directly at spaced points on the surface of said object, calibrated means fixedly spaced from said object for detecting said produced sounds, and means including digital apparatus for registering in time said detected sounds.

8. The combination of claim 7 wherein said detecting means include microphones.

9. The combination of claim 8 wherein said digital apparatus includes a binary operatively connected with each of said microphones for producing travel time signals, an and gate operatively connected with each of said microphones for receipt of said time signals, and a clock pulser connected to the input of each of said and gates for converting said time signals into digital output pulses suitable for counting.

10. The combination of claim 8 wherein said digital apparatus includes a binary operatively connected with each of said microphones for producing travel time signals, an and gate operatively connected with each of said microphones for receipt of said time signals, and a clock pulser connected to the input of each of said and gates, for converting said time signals into digital output pulses suitable for counting, and a scaler connected to the output of each of said and gates for counting said digital ouput pulses.

11. The combination of claim 7 wherein said sound producing means comprises an elongated wire-like member conforming to the surface contours of an irregularly shaped solid object, a plurality of sound producing elements attached to said member at longitudinally spaced intervals therealong, and means for initiating operation of said sound producing elements.

12. The combination of claim 7 wherein said sound producing means comprises an electric conductor placed in conformity to surface contours of a solid object over predetermined portions of the latter and a plurality of longitudinally spaced electrically detonated explosive charges fixed to said conductor at longitudinally spaced intervals thereon for detonation by said conductor when the latter is electrically energized.

13. In a method of measuring an object having a dimensionally unknown surface, the steps of: placing a plurality of sound sources at spaced random points on said surface; positioning a plurality of sound detectors in relatively fixed spaced relation to each other for establishing at least four direct sound paths extending different distances for each sound source; generating sound energy concentrated at each of sound sources for propagation along said sound paths; and registering detection by the sound detectors of the sound energy emitted from the sound sources during measurement intervals at least equal to the travel time along the sound paths of maximum distance.

14. The method of claim 13 further including the steps of: varying the measurement interval in accordance with a change in rate of sound detection by the sound detectors.

15. The method of claim 14 wherein said step of registering the detection of sound energy comprises the steps of: converting sound signals detected by the sound detectors into digital time pulses, counting the time pulses derived from each sound detector during each measurement interval; and recording the counts so obtained.

16. The method of claim 13 wherein said step of registering the detection of sound energy comprises the steps of: converting sound signals detected by the sound detectors into digital time pulses, counting the time pulses derived from each sound detector during each measurement interval, and recording the counts so obtained.

17. Apparatus adapted for use in connection with measurement of a dimensionally unknown surface comprising, flexible conductive means adapted to be placed on said surface, sound emitting means fixedly spaced along said flexible conductive means, a plurality of sound detectors mounted in fixed spaced relation to each other for detection of sound energy emitted from said sound emitting means, means for registering said detection of sound energy at different times during a measurement cycle, and controllable means operatively connected to said flexible conductive means for energization of the sound emitting means during said measurement cycle for dispatching sound energy to the sound detectors along at least four sound paths of different lengths.

References Cited by the Examiner
UNITED STATES PATENTS

| | | | |
|---|---|---|---|
| 2,453,502 | 11/48 | Dimmick | 340—16 X |
| 2,533,499 | 12/50 | Munson | 340—16 X |
| 2,573,748 | 11/51 | Weinstein | 340—16 X |
| 2,587,715 | 3/52 | Fairchild | 340—16 X |
| 2,916,289 | 12/59 | Zito | 340—16 X |

FOREIGN PATENTS 911,824   5/54   Germany.

CHESTER L. JUSTUS, *Primary Examiner.*